United States Patent
Sullivan

(10) Patent No.: US 7,264,202 B2
(45) Date of Patent: Sep. 4, 2007

(54) TRI-CYCLOIDAL AIRSHIP

(75) Inventor: Callum R. Sullivan, New Market, AL (US)

(73) Assignee: Information Systems Laboratories, Inc., San Diego, CA (US)

( * ) Notice: Subject to any disclaimer, the term of this patent is extended or adjusted under 35 U.S.C. 154(b) by 57 days.

(21) Appl. No.: 11/263,877

(22) Filed: Nov. 1, 2005

(65) Prior Publication Data

US 2007/0095983 A1 May 3, 2007

(51) Int. Cl.
*B64B 1/02* (2006.01)

(52) U.S. Cl. .......................................... 244/96; 244/24

(58) Field of Classification Search .............. 244/24, 244/25, 26, 27, 30, 31, 125, 127, 126, 96
See application file for complete search history.

(56) References Cited

U.S. PATENT DOCUMENTS

| | | | |
|---|---|---|---|
| 1,264,152 A | 4/1918 | Briggs | |
| 1,638,726 A * | 8/1927 | Chiarelli | 244/27 |
| 1,656,492 A | 1/1928 | Moineau | |
| 1,795,501 A | 3/1931 | Platt | |
| 1,922,606 A * | 8/1933 | Voith | 440/93 |
| 2,160,850 A * | 6/1939 | Forton | 244/27 |
| 2,507,657 A | 5/1950 | Wiessler | |
| 3,231,220 A * | 1/1966 | Fischer | 244/9 |
| 3,291,086 A * | 12/1966 | Haselton | 114/330 |
| 3,801,047 A | 4/1974 | Dell'Aquila | |
| 3,938,759 A * | 2/1976 | Bastide | 244/9 |
| 4,194,707 A | 3/1980 | Sharpe | |
| 4,247,251 A | 1/1981 | Wuenscher | |
| 4,450,364 A * | 5/1984 | Benoit | 290/55 |
| 4,482,110 A * | 11/1984 | Crimmins, Jr. | 244/26 |
| 5,071,090 A * | 12/1991 | Takahashi et al. | 244/29 |
| 5,100,080 A | 3/1992 | Servanty | |
| 5,265,827 A | 11/1993 | Gerhardt | |
| 5,462,406 A * | 10/1995 | Ridgewell et al. | 416/111 |
| 5,676,524 A | 10/1997 | Lukas | |
| 6,320,273 B1 | 11/2001 | Nemec | |
| 2006/0266886 A1* | 11/2006 | Nachbar | 244/125 |

* cited by examiner

*Primary Examiner*—Michael J. Carone
*Assistant Examiner*—Benjamin Paul Lee
(74) *Attorney, Agent, or Firm*—Nydegger & Associates

(57) ABSTRACT

An unmanned, lighter-than-air airship includes three omni-directional thrust generating units. One unit is mounted at the fore-end of the airship to generate thrust in a plane that is perpendicular to the longitudinal axis of the airship. This unit controls pitch and yaw movements of the airship. The other two units are mounted on the airship equidistant from the first unit, and are located in a same midships plane that is perpendicular to the longitudinal axis. These two units generate thrust vectors that control roll movements of the airship and provide propulsion for the airship.

19 Claims, 1 Drawing Sheet

TRI-CYCLOIDAL AIRSHIP

FIELD OF THE INVENTION

The present invention pertains generally to systems and methods for flying unmanned, lighter-than-air airships. More particularly, the present invention pertains to systems and methods for both propelling and controlling the flight of an airship. The present invention is particularly, but not exclusively useful as a system and method for operating omnidirectional, cycloidal units that generate thrust vectors which, in concert, propel an airship, as well as provide control in pitch, yaw and roll.

BACKGROUND OF THE INVENTION

Control over the propulsion and maneuver of an airborne vehicle, just like control over land or sea vehicles, requires an ability to selectively generate controllable forces on the vehicle. In the simple case where a hot air balloon is being used as an airborne vehicle, only the lifting force that is necessary to overcome the weight of the balloon can be generated and controlled. Thus, hot air balloons can not be effectively maneuvered. As a practical matter, however, most airborne vehicles need to be maneuverable. To do this, it is necessary to generate forces on the vehicle that will keep it airborne (i.e. lift) and propel it through the air (i.e. thrust). Additionally, it is necessary to generate forces that will establish and maintain a desired altitude for the airborne vehicle in pitch, yaw and roll, as it is being propelled through the air.

For the specific case of a lighter-than-air airship, the lifting force that keeps the airship airborne is a lighter-than-air gas (e.g. helium). In general, the gas that is to provide lift is somehow confined within the fuselage of the airship, much like a hot air balloon. For such a vehicle, however, the maneuver forces that provide control for thrust, pitch, yaw and roll must be provided by other means. Typically, these forces are provided by various combinations of propulsion units (e.g. engine driven propellers), and control surfaces (e.g. rudder, elevator and trim planes). When used in manned airships, where some degree of operational stability is essential for crew effectiveness, typical power plants and control surfaces are quite adequate. On the other hand, if the airship is unmanned, non-traditional power plants may be more effectively employed. This will be particularly so if the airship's fuselage is to be maneuvered and maintained in variously selected orientations for extended periods of time, which might otherwise cause extreme discomfort for an aircrew member.

Examples of applications for an unmanned airship include such uses as advertising and surveillance. For instance, it is apparent that about only one-third of an airship's fuselage surface can be effectively seen by an observer on the ground. On the other hand, an airship that can be maneuvered in roll through 120°, and thereafter selectively held stationary, could effectively present a sequence of three different advertisements to the same viewing audience. In another application, an airship that can be maneuvered to be geo-stationary for a selected period of time, and then conveniently moved to another geo-stationary location, could be useful for a variety of surveillance applications. In these, and all other cases, there are control considerations that need to be addressed. Importantly, in all of these cases, control is provided by the selective application of forces on the airship.

Power plants (i.e. propulsion units) for airborne vehicles are of many types and variations. In all instances, however, they are specifically employed to generate a thrust vector that has both a direction and a magnitude. One particular type of propulsion unit that is of specific interest here, is a so-called cycloidal propulsion unit. Such a unit is disclosed in detail in U.S. application Ser. No. 10/690,284 titled "Cycloidal VTOL UAV," which is assigned to the same assignee as the present invention and which is incorporated herein, in its entirety. The particularly interesting aspect of such a cycloidal propulsion unit is the fact that it can generate a thrust vector that is located in a definable plane. In particular, a cycloidal propulsion unit can generate a thrust vector of variable magnitude, and establish a direction for the thrust vector that is variable through 360° in the plane. Simply stated, a cycloidal propulsion unit can create a thrust vector that is controllable and variable in both magnitude and direction, in a given plane.

In light of the above, it is an object of the present invention to provide a lighter-than-air airship that incorporates cycloidal propulsion units for producing maneuver and control forces on the airship. Another object of the present invention is to provide an airship with the ability to execute 360° of roll, and maintain a selected orientation in roll for an extended period of time. Yet another object of the present invention is to provide an airship that can selectively move to, and then loiter at, a sequence of geo-stationary locations. Still another object of the present invention is to provide a lighter-than-air airship with cycloidal propulsion units that is relatively easy to manufacture, is simple to operate, and is comparatively cost effective.

SUMMARY OF THE INVENTION

An airship in accordance with the present invention includes a fuselage for holding a lighter-than-air gas that provides lift for the airship. Further, the fuselage has a fore-end and an aft-end, and it also defines a longitudinal axis that extends between the two ends. Maneuverability of the airship is provided by various thrust generators that are mounted on the fuselage to provide both propulsion and control for the airship. Specifically, due to their respective locations, and their orientations on the fuselage, these thrust generators are capable of providing propulsion, as well and control in pitch, yaw and roll for the airship. As intended for the present invention, all of the thrust generators are omnidirectional, cycloidal units.

For the present invention, one omnidirectional, cycloidal unit is mounted at the fore-end of the fuselage. This particular unit generates a thrust that is selectively directed in a thrust vector plane which is substantially perpendicular to the longitudinal axis of the airship. The specific purpose of this unit is to control both the pitch and yaw motions of the airship. Additionally, another such unit can be mounted at the aft-end of the fuselage for this same purpose. For the present invention, if both units are employed, they can be controlled either individually, or in concert with each other. Further, an empennage can be formed on the airship to aerodynamically assist in the pitch and yaw control of the airship.

In addition to the thrust generators disclosed above, the airship of the present invention also includes a plurality of omnidirectional, cycloidal units that are mounted on the fuselage and are located in a same, midships plane. In detail, the midships plane is perpendicular to the longitudinal axis of the airship, and it is located at a distance "d" from the fore-end of the airship. Further, with the distance between the fore-end and the aft-end of the airship being a distance "l", the distance "d" will preferably be less than half of "l"

(d<I/2). Within this arrangement, each of the thrust generating units in the midships plane will generate a thrust vector that can be selectively directed in a respective thrust vector plane. Each of these thrust vector planes is substantially parallel to the longitudinal axis of the airship. Thus, they are able to provide both propulsion for the airship, and control for the roll motions for the airship.

In one embodiment of the present invention, there are two propulsion/control units in the midships plane. For this embodiment the thrust vector plane of the first propulsion/control unit is substantially parallel to the thrust vector plane of the second propulsion/control unit. In another embodiment of the present invention there are at least three, and possibly more, such propulsion/control units. For either embodiment, all of the propulsion/control units are mounted on the fuselage substantially equidistant from the longitudinal axis. Further, they are each substantially equidistant from each adjacent propulsion/control unit.

For purposes of the present invention, all of the omnidirectional, thrust-generating, control units are cycloidal and, preferably, they all operate in a curtate mode. Operational control of the units can be accomplished individually, or in concert with each other. This is so for control units that are positioned on the longitudinal axis of the airship (pitch and yaw control), and for the propulsion/control units that are positioned in the midships plane (propulsion and roll control).

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
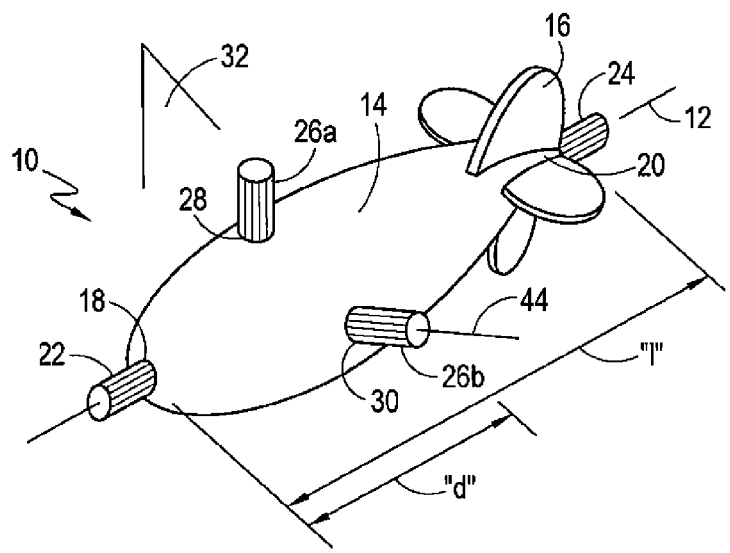
FIG. 1 is a perspective view of an airship in accordance with the present invention.

Referring initially to FIG. 1, an airship in accordance with the present invention is shown, and is generally designated 10. As shown, the airship 10 defines a longitudinal axis 12 and includes a fuselage 14 with an empennage 16. More specifically, the longitudinal axis 12 extends between a fore-end 18 of the airship 10, and its aft-end 20. As intended for the present invention, the airship 10 is a lighter-than-air vehicle. Therefore the fuselage 14 is filled with a lighter-than-air gas, such as Helium. In many respects, the airship 10 is much like any other so-called "blimp." The primary difference between the airship 10 and other lighter-than-air vehicles, however, is in its systems for propulsion and control.

For purposes of propelling and controlling the airship 10, FIG. 1 shows that the airship 10 includes a propulsion unit 22 that is mounted at the fore-end 18 of the airship 10. Also, FIG. 1 shows that there is a propulsion unit 24 mounted at the aft-end 20 of the airship 10, and that there is a plurality of propulsion units 26 mounted on the fuselage 14. In detail, FIG. 1 shows that a propulsion unit 26a is mounted at a point 28 on the fuselage 14, and that a propulsion unit 26b is mounted at a point 30 on the fuselage 14. It is to be appreciated, however, that there may be additional propulsion units 26 for the airship 10 and that the propulsion units 26a,b are, therefore, only exemplary. Regardless of how many propulsion units 26 are used, they will all be, preferably, mounted in a same midships plane 32 (note: only a portion of the midships plane 32 is indicated in FIG. 1). As for the relationship of the midships plane 32 to the airship 10 (see FIG. 1), it is located somewhere between the fore-end 18 and the aft-end 20, and it is substantially perpendicular to the longitudinal axis 12 of the airship 10. Further, for a distance "I" between the fore-end 18 and the aft-end 20, the midships plane 32 will be located on the axis 12, at a distance "d" from the fore-end 18. Preferably, "d" is less than half the distance "I" (d<I/2).

Figure 2:
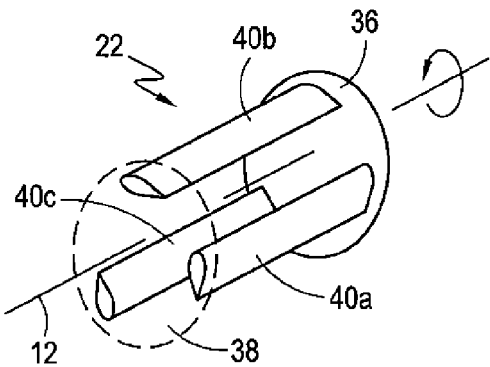
FIG. 2 is a perspective view of a cycloidal propulsion unit for the airship of the present invention with portions thereof shown in phantom for clarity.

For purposes of this disclosure, the propulsion unit 22, shown in FIG. 2, is only exemplary. Indeed, for the airship 10 of the present invention, the other propulsion units 24 and 26 are all substantially identical to the propulsion unit 22. In particular, all of these propulsion units are omnidirectional, and they all function in a cycloidal mode. Structurally, as shown in FIG. 2, the propulsion unit 22 includes a hub 36 and a hub 38 that are oriented to rotate about a same axis (e.g. axis 12). Further, they jointly support a plurality of airfoil blades 40a,b,c between them. Thus, as the hubs 36 and 38 are rotated to move the airfoil blades 40a,b,c around the axis 12; and as the airfoil blades 40a,b,c are controlled to generate variable forces as they rotate around the axis 12; the propulsion unit 22 will generate a thrust vector (T). Importantly, the thrust vector (T) will always be directed in a thrust vector plane that is substantially perpendicular to the axis 12. The actual direction of the thrust vector (T) in the thrust vector plane, however, will depend on the cycloidal input that is given to the airfoil blades 40a,b,c. In this operation, the propulsion unit 22 will move the airfoil blades 40a,b,c in a curtate mode that is described in greater detail in U.S. application Ser. No. 10/690,284 mentioned above.

Figure 3:
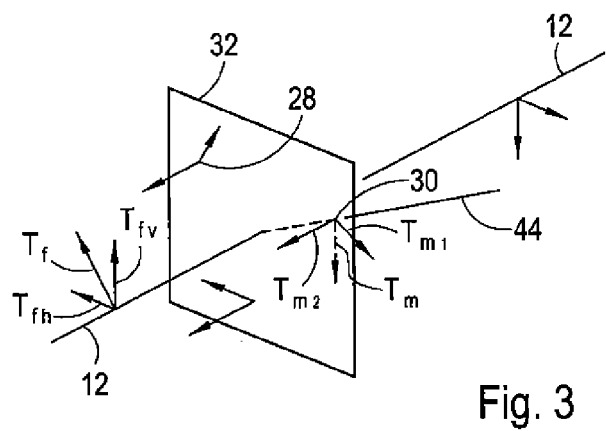
FIG. 3 is a representative illustration of a relationship between thrust vectors of propulsion units, and their respective orientations, as used for propelling and maneuvering an airship in accordance with the present invention.

For the airship 10, insofar as their individual operation is concerned, the propulsion units 22, 24 and 26 are all substantially identical. They are, however, mounted at different locations on the fuselage 14. With this in mind, first consider the propulsion unit 22 (see FIG. 2) with reference to FIG. 3. With this consideration it is to be seen that the propulsion unit 22 can be operated to create a thrust vector $T_f$ that is directed in a plane perpendicular to the longitudinal axis 12 of the airship 10. Importantly, the thrust vector $T_f$ will have both a vertical component $T_{fv}$ and a horizontal component $T_{fh}$. Depending on the magnitude and the direction of $T_f$ in the plane perpendicular to the axis 12, the vertical component $T_{fv}$ can be varied to control pitch for the airship 10. Similarly, the horizontal component $T_{fh}$ that can be varied to control the yaw motion of the airship 10. As mentioned above, it is to be appreciated that a propulsion unit 24 at the aft-end 20 can be added to supplement the control aspects provided by the propulsion unit 22. Now consider the propulsion unit 26b that is located in the midships plane 32. By cross-referencing FIG. 3 with FIG. 1, it will be seen that the propulsion unit 26b can be operated to create a thrust vector $T_m$ that is perpendicular to its axis 44. Also, it is seen that this thrust vector $T_m$ is directed in a plane that is parallel to the axis 12. Thus, depending on its magnitude and direction, this thrust vector $T_m$ can be generated to have an azimuthal component $T_{m1}$ and an axial component $T_{m2}$. Accordingly, for control purposes, the azimuthal component $T_{m1}$ can be varied to control roll for the airship 10. On the other hand, the axial component $T_{m2}$ can be varied to provide propulsion for the airship 10. As shown in the drawings, other propulsion units 26 can be positioned in the midships plane 32 and similarly operated to control roll and provide propulsion.

In an overview for the operation of the airship 10, the propulsion unit 22 generates a thrust vector that lies in a thrust vector plane perpendicular to the longitudinal axis 12 of the airship 10. Specifically, depending on its magnitude and direction, this thrust vector, $T_f$ is used to control pitch and yaw motions of the airship 10. If desired, a propulsion unit 24 can be added and used with the propulsion unit 22 for this same purpose. In an alternate embodiment, the propulsion unit 24 can possibly be used alone, as an alternative to the propulsion unit 22. In any case, along with the propulsion units 24/26, a desired number (i.e. a plurality) of propulsion units 26 are mounted on the airship 10 in the midships plane 32. Specifically, these propulsion units 26 are used to generate thrust vectors that lie in respective thrust vector planes that are parallel to the longitudinal axis 12 of the airship 10. These thrust vectors (provided by propulsion units 26) have azimuthal components that control roll of the airship 10, and axial components that provide propulsion for the airship 10.

While the particular Tri-Cycloidal Airship as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An airship which comprises:
    a fuselage having a fore-end and an aft-end, and defining a longitudinal axis extending therebetween;
    at least one control unit mounted on said fuselage for generating thrust directed in a thrust vector plane substantially perpendicular to the longitudinal axis to control pitch and yaw motions of said airship; and
    a plurality of propulsion/control units mounted on said fuselage substantially equidistant from the longitudinal axis and in a same midships plane, wherein the midships plane of said propulsion/control units is substantially perpendicular to the longitudinal axis and each propulsion/control unit is substantially equidistant from each other said propulsion/control unit, with each said propulsion/control unit generating thrust directed in a respective thrust vector plane substantially parallel to the longitudinal axis to provide propulsion and roll control motions for said airship.

2. An airship as recited in claim 1 comprising a plurality of said control units, with a first said control unit mounted at the fore-end of said airship and a second said control unit mount at the aft-end of said airship.

3. An airship as recited in claim 2 further comprising means for operating said first control unit in concert with said second control unit.

4. An airship as recited in claim 2 further comprising a means for operating said first control unit independently from said second control unit.

5. An airship as recited in claim 1 comprising a first propulsion/control unit and a second propulsion/control unit, wherein the thrust vector plane of said first propulsion/control unit is substantially parallel to the thrust vector plane of said second propulsion/control unit.

6. An airship as recited in claim 1 further comprising a means for concerted operation of said at least one control unit and said plurality of propulsion/control units.

7. An airship as recited in claim 1 wherein said at least one control unit and said propulsion/control units are cycloidal propeller units and operate in a curtate mode.

8. An airship as recited in claim 1 wherein said airship is lighter-than-air.

9. A propulsion and control system for an unmanned airship which comprises:
    a first multi-directional cycloidal propeller unit for generating and directing thrust in a first thrust vector plane to control pitch and yaw movements of the airship;
    a second multi-directional cycloidal propeller unit for generating and directing thrust in a second thrust vector plane; and
    a third multi-directional cycloidal propeller unit for generating and directing thrust in a third thrust vector plane, wherein both said second unit and said third unit are equidistant from said first unit and are located in a midships plane, with the midships plane at a predetermined distance "d" from said first unit, and wherein both said second unit and said third unit operate in concert with each other to provide propulsion and roll control for said airship.

10. A system as recited in claim 9 further comprising:
    a fuselage having a fore-end and an aft-end, and defining a longitudinal axis extending therebetween, wherein said first multi-directional cycloidal propeller unit is mounted at the fore-end of said fuselage; and
    a fourth multi-directional cycloidal propeller unit mounted at the aft-end of said fuselage.

11. A system as recited in claim 10 wherein said first cycloidal propeller unit and said fourth cycloidal propeller unit are located on the longitudinal axis with a distance "l" therebetween, and further wherein the distance "d" is less than half the distance "l" (d <l/2).

12. A system as recited in claim 10 further comprising an additional multi-directional cycloidal propeller unit located in the midships plane to provide propulsion and roll control for said airship.

13. A system as recited in claim 9 further comprising a means for concerted operation of said first, second and third cycloidal propeller units.

14. A system as recited in claim 9 wherein said first, second and third cycloidal propeller units operate in a curtate mode.

15. A system as recited in claim 9 wherein said airship is lighter-than-air.

16. A method for propelling and controlling an airship which comprises the steps of: generating at least three propulsion thrust vectors wherein each propulsion thrust vector lies in a respective thrust vector plane with a first thrust vector plane substantially perpendicular to both a second thrust vector plane and a third thrust vector plane; and
    concertedly controlling a magnitude and a direction for each propulsion thrust vector, wherein control in the first thrust vector plane control pitch and yaw movements of the airship and control in the second and third trust vector planes control propulsion and roll movements of the airship.

17. A method as recited in claim 16 wherein the thrust vectors are generated by multi-directional cycloidal propeller units.

18. A method as recited in claim 17 wherein the multi-directional cycloidal propeller units are operated in a curtate mode.

19. A method as recited in claim 16 wherein the airship is unmanned and is lighter-than-air.

* * * * *